(12) United States Patent
Siegel

(10) Patent No.: US 6,922,780 B1
(45) Date of Patent: Jul. 26, 2005

(54) DUAL CHIP SMART CARD AND METHOD FOR USING SAME

(75) Inventor: Philip I. Siegel, Fountain Valley, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 936 days.

(21) Appl. No.: 09/634,142

(22) Filed: Aug. 8, 2000

(51) Int. Cl.$^7$ .............................. H04L 9/00; H04N 7/167
(52) U.S. Cl. ........................ 713/189; 713/172; 380/210; 380/239
(58) Field of Search ................................ 713/189, 172, 713/193, 194, 192; 380/210, 239, 227, 229; 714/13

(56) References Cited

U.S. PATENT DOCUMENTS

| | | | | |
|---|---|---|---|---|
| 4,600,257 A | * | 7/1986 | Fushimoto | 439/137 |
| 4,916,296 A | * | 4/1990 | Streck | 235/454 |
| 4,926,479 A | * | 5/1990 | Goldwasser et al. | 713/180 |
| 5,742,680 A | * | 4/1998 | Wilson | 380/227 |

OTHER PUBLICATIONS

Michael Robin et al., *Digital Television Fundamentals—Design And Installation Of Video And Audio Systems*, McGraw–Hill, Chapter 8 title page(s) and pp. 345–425.

* cited by examiner

Primary Examiner—Gilberto Barrón Jr.
Assistant Examiner—Kambiz Zand
(74) Attorney, Agent, or Firm—Georgeon S. Grunebach

(57) ABSTRACT

A smart card is provided comprising a first processor and a second processor. The first and second processors are capable of decoding a scrambled broadcast signal. The first processor is activated by a first activating signal, and the second processor is activated by a second activating signal that differs from the first activating signal. The first processor can be a primary processor that is used during normal operations, while the second processor can be a backup processor that is activated under emergency conditions. The second processor, to be used temporarily when backup service is required, can be of lower complexity than the first processor, thus reducing cost. The first and second processors are situated on the card so as to communicate with an opening in an electrical device such as a integrated receiver. Preferably, the first processor is situated so as to make electrical contact with the receiver within an opening when the card is in a first position, and the second processor is situated so as to make electrical contact with the receiver within the opening when the card is in a second position. Also provided is a method of providing a backup program service to a subscriber. The method comprises providing to the subscriber a smart card of the invention and transmitting a backup activating signal that activates the second, or backup, processor on the smart card. The backup activating signal is transmitted upon failure of the primary processor.

40 Claims, 8 Drawing Sheets

DUAL CHIP SMART CARD AND METHOD FOR USING SAME

BACKGROUND OF THE INVENTION

1. Field of the Invention

This invention relates to improvements in the design and use of smart cards, and in particular to a smart card having a second processor.

2. Description of the Related Art

A smart card is a well-known security device that is used to permit or deny access to certain equipment, services or the like. Smart cards generally comprise a small processor having one or more electrical contacts. When the smart card is inserted into a smart card reader or other device, the electrical contacts on the smart card and similar contacts in the equipment become intercoupled, allowing the smart card to share information with the device.

Smart cards are used in integrated receiver devices (IRD) for receiving satellite broadcast material. All or part of such broadcast material may be encrypted to limit access to those that have paid the appropriate fee to view the broadcast material. The smart card includes a processor having a memory storing control information that enables decryption of an encrypted television signal for viewing by a user. All broadcast material may be encrypted, thus denying access to all that do not possess the appropriate smart card. Alternatively, only a portion of the broadcast material can be encrypted. This allows those without the appropriate smart card to view some, but not all of the channels. Smart cards can also be used to implement pay per view (PPV) services in which the user must pay a feed to receive a specific broadcast at a particular time. Upon receipt of the required fee, the broadcast provider can enable new control signals from the card for access to the other services. Further, in some circumstances, the smart card processors are remotely programmable. That is, program instructions implementing the processor functions can be received by the IRD and loaded into the processor memory, augmenting or substituting for existing processor program instructions.

There is currently a risk of a broadcast or other transmission that may render all or a large number of the smart card processors in use by subscribers temporarily or permanently inoperative. In such circumstances, new smart cards must be manufactured and distributed to all affected subscribers before the subscribers would be able to again receive service. This process can take months, putting the broadcast service provider at risk of losing customers to competing service providers. From the foregoing, it can be seen that there is a need for smart card that can be rapidly re-activated or replaced following failure of a processor or other device on the smart card.

SUMMARY OF THE INVENTION

According to one aspect of the present invention there is provided a smart card comprising a first processor and a second processor, which can provide conditional access to broadcast services by, either alone or in combination with other circuits and/or elements, decrypting an encrypted program signal. The decrypting functionality of the first processor can be activated by a first activating signal, and the decrypting functionality of the second microprocessor can be activated by a second activating signal that may differ from the first activating signal. The first processor is a primary microprocessor that is used during normal operation, while the second processor is usable as a backup processor that can be selectively activated under emergency conditions. In one embodiment, the second processor, which is generally used temporarily when backup service is required, is of lower complexity and/or capability than the first processor. This allows the smart card to provide basic functionality, even when the first microprocessor fails, while minimizing cost.

The invention provides for quickly and efficiently bringing backup service to subscribers in the event that a large group of primary microprocessors becomes non-functional. By activating a backup device already present in the existing smart cards, long delays in service while new cards are manufactured and distributed can be avoided.

According to a preferred embodiment of the invention, the first and second processors are situated on a single smart card so as to operatively couple with contacts within the IRD. Preferably, the first processor is situated so as to make communicative contact with one or more of the electrical device contacts when the card is in a first position, and the second processor is situated so as to make communicative contact with the same or different contac(s) of the electrical device when the card is in a second orientation. In one embodiment, the smart card is marked so as to indicate the orientation of the card with respect to the opening.

In a further embodiment of the present invention, a means is provided prevent contact between the receiver and the second processor until such time that such contact is desired. In one embodiment, this is accomplished by scoring the top layer of the card. The scored section can be removed when desired, thereby exposing the second processor and its contacts, and permitting communication with the receiver. In another embodiment, this is accomplished by including an adhesive cover that can be peeled away to reveal the second processor.

According to another aspect of the present invention there is provided a method of providing backup program service to a subscriber. The method comprises providing to the subscriber a smart card of the invention and transmitting a backup activating signal that activates the second, or backup, microprocessor on the smart card. The backup activating signal is transmitted upon failure of the primary microprocessor.

Also provided is a system for providing a program signal to subscribers. The system comprises a receiver for receiving signals from a program source, wherein the signals include program material, a primary activating signal and a backup activating signal. The system further comprises a smart card comprising a first processor for decrypting received signals upon activation by the primary activating signal and a second processor for decrypting received signals when the backup activating signal is received by the receiver.

BRIEF DESCRIPTION OF THE DRAWINGS

Reference will now be made, by way of example to the accompanying drawings, in which.

DETAILED DESCRIPTION OF PREFERRED EMBODIMENT

In the following description, reference is made to the accompanying drawings that form a part hereof, and in which show, by way of illustration, several embodiments of the present invention. It is understood that other embodiments may be utilized and structural changes may be made without departing from the scope of the present invention.

Figure 1:
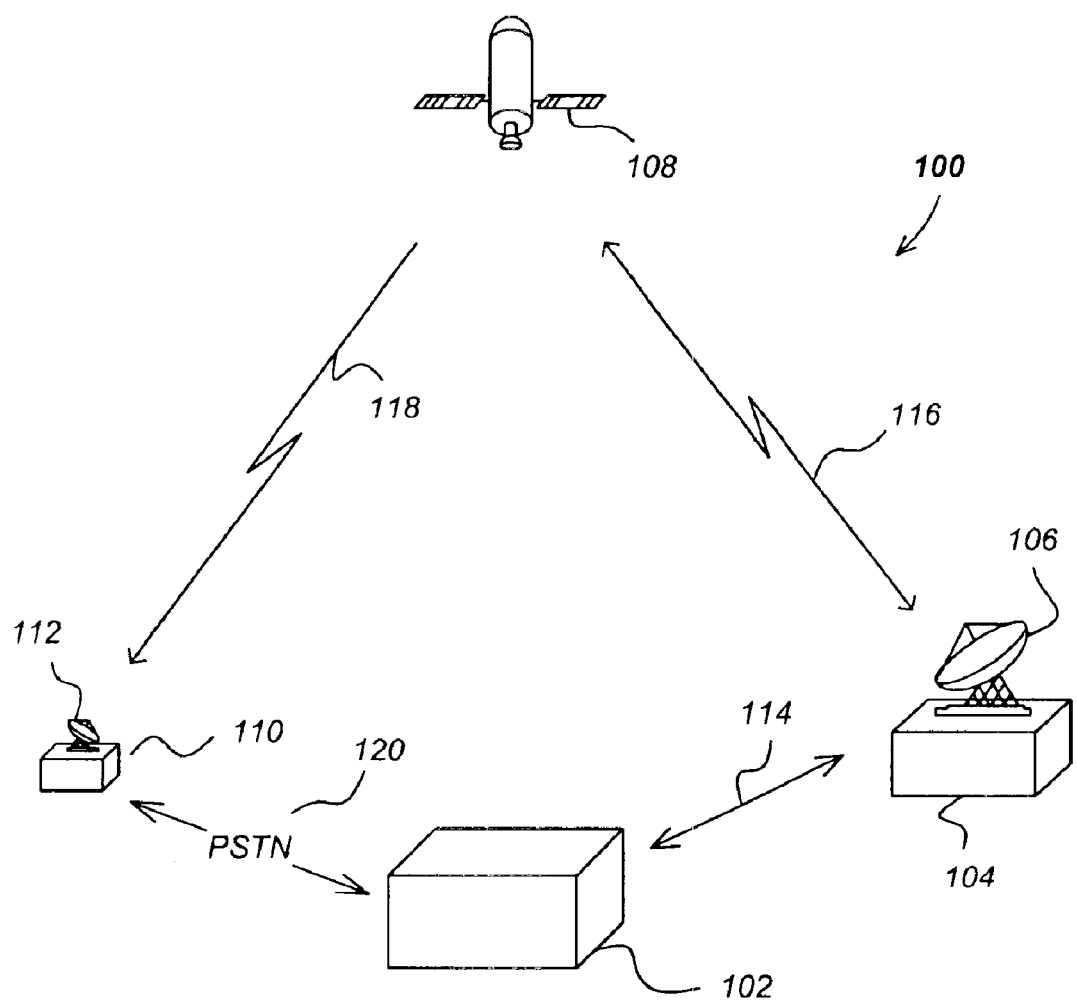
FIG. 1 is a diagram showing an overview of a program distribution system.

FIG. 1 is a diagram illustrating an overview of a video distribution system 100. The video distribution system 100 comprises a control center 102 in communication with an uplink center 104 via communication link 114 and with a subscriber 110 via a PSTN or other link 120. The control center 102 provides program material to the uplink 104 center, coordinates with the subscribers 110 to offer pay-per-view (PPV) program services, including billing and associated decryption of video programs.

The uplink center 104 receives program material and program control information from the control center 102, and using an uplink antenna 106, transmits the program material and program control information to the satellite 108 via uplink 116. The satellite receives and transmits the video programs and control information to the subscriber via downlink 118. The subscriber 110 receives this information using the subscriber antenna 112. In one embodiment, the subscriber antenna 112 is an 18-inch slightly oval-shaped Ku-band antenna.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein is described with reference to a satellite based digital video distribution system 100, the present invention may also be practiced with terrestrial-based transmission of program information, whether by broadcast, unicast, cable, the Internet, or other means. Further, the different functions collectively allocated among the control center 102 and the uplink 104 as described above can be reallocated between these facilities as desired without departing from the intended scope of the present invention.

Although the foregoing has been described with respect to an embodiment in which the program material delivered to the subscriber is video (and audio) program material such as a movie, the foregoing method can be used to deliver program material comprising purely audio, or any combination of information as well.

Figure 2:
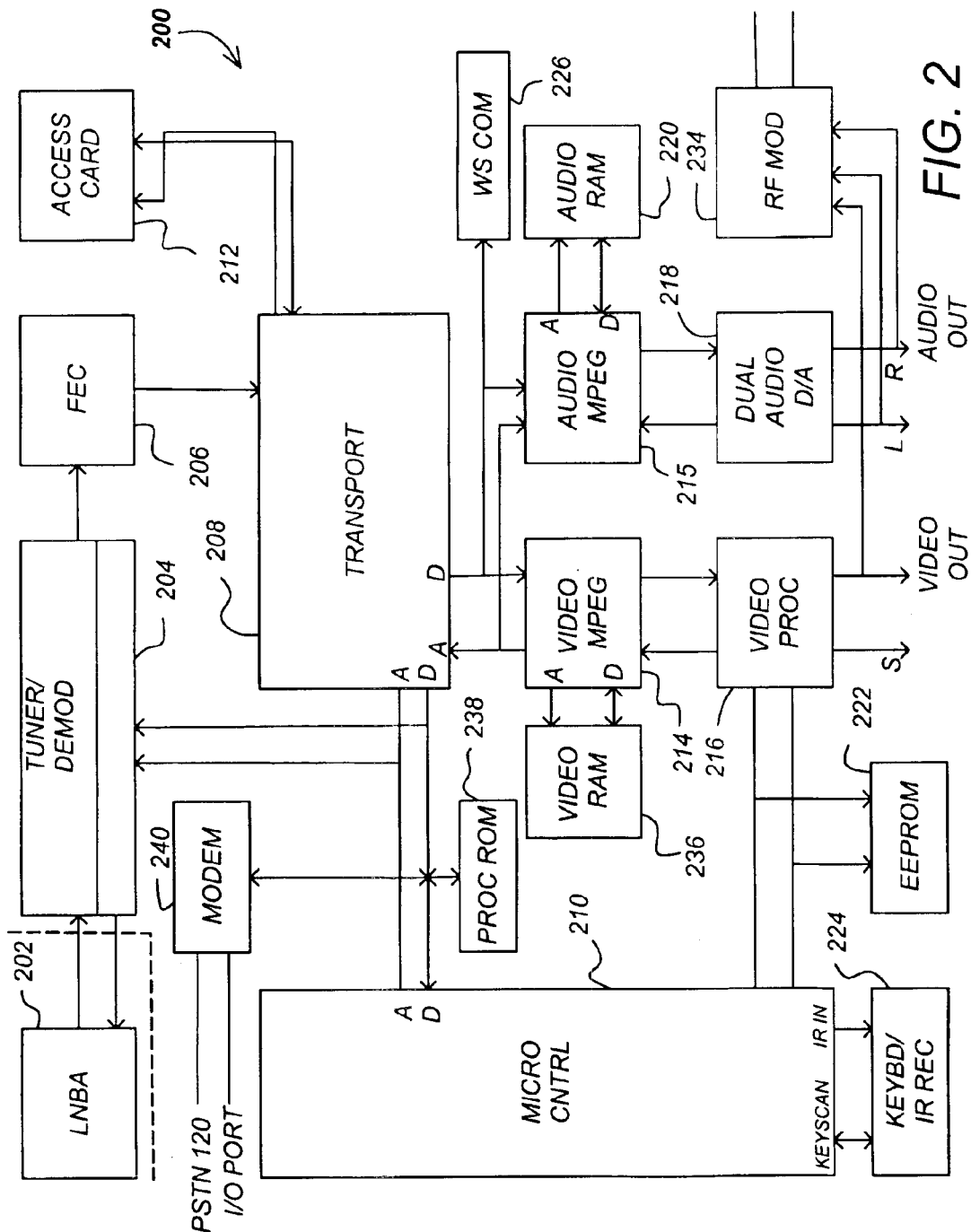
FIG. 2 is a block diagram of an integrated receiver/decoder for practicing the present invention.

FIG. 2 is a block diagram of an integrated receiver/decoder (hereinafter alternatively referred to as IRD or receiver 200). The receiver 200 comprises a tuner/demodulator 204 communicatively coupled to the LNB 202. The LNB 202 converts the e.g. 12.2- to 12.7 GHz downlink 118 signal from the satellites 108 to, e.g., a 950–1450 MHz signal required by the receiver's 200 tuner/demodulator 204.

The tuner/demodulator 204 isolates a single, digitally modulated transponder, and converts the modulated data to a digital data stream. The digital data stream is then supplied to a forward error correction (FEC) decoder 206. This allows the receiver 200 to reassemble the data transmitted by the uplink center 104 (which applied the forward error correction to the desired signal before transmission to the subscriber 110) verify that the correct data signal was received, and correct errors, if any. The error-corrected data may be fed from the FEC decoder module 206 to the transport module via an interface, such as an 8-bit parallel interface.

The transport module 208 performs many of the data processing functions performed by the receiver 200. The transport module 208 processes data received from the FEC decoder module 206 and provides the desired processed data to the video MPEG decoder 214 and the audio MPEG decoder 216. In one embodiment of the present invention, the transport module, video MPEG decoder and audio MPEG decoder are all implemented on integrated circuits. This design promotes both space and power efficiency, and increases the security of the functions performed within the transport module 208. The transport module 208 also provides a passage for communications between the microcontroller 210 and the video and audio MPEG decoders 214, 216. As set forth more fully hereinafter, the transport module also works with the access card 212 to determine whether the subscriber 110 is permitted to access certain program material. Data from the transport module can also be supplied to external communication module 226.

The access card 212 functions in association with other elements to decode an encrypted signal from the transport module 208. The access card 212 may also be used for tracking and billing these services. In one embodiment of the present invention, the access card is a smart card, having contacts cooperatively interacting with contacts in the receiver 200 to pass information. In order to implement the processing performed in the access card 212, the receiver 200, and specifically the transport module 208 provides a clock signal to the access card 212.

Video data may be processed by an MPEG video decoder 214. Using the video random access memory (RAM) 236, the MPEG video decoder 214 decodes the compressed video data and sends it to an encoder or video processor 216, which converts the digital video information received from the video MPEG module 214 into one or more output signals usable by a display or other output device. By way of example, video processor 216 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the audio decoder 215 such as an MPEG or an AC-3 decoder. The decoded audio data may then be sent to a digital to analog (D/A) converter 218. In one embodiment of the present invention, the D/A converter 218 is a dual D/A converter, one for the right and left channels. If desired, additional channels can be added for use in surround sound processing or secondary audio programs (SAPs). In one embodiment of the invention, the dual D/A converter 218 itself separates the left and right channel information, as well as any additional channel information. Other audio formats may similarly be supported.

A description of the processes performed in the encoding and decoding of video streams, particularly with respect to MPEG and JPEG encoding/decoding, can be found in Chapter 8 of "Digital Television Fundamentals, by Michael Robin and Michel Poulin, McGraw-Hill, 1998, which is hereby incorporated by reference herein.

Microcontroller 210 receives and processes command signals from the remote control 224, a receiver 200 keyboard interface, and/or another input device. The microcontroller receives commands for performing its operations from a processor programming memory, which permanently stores such instructions for performing such commands. The processor programming memory may comprise a read only memory (ROM) 238, an electrically erasable programmable read only memory (EEPROM) or, similar memory device. The microcontroller 210 also controls the other digital devices of the receiver 200 via address and data lines (denoted "A" and "D" respectively, in FIG. 2).

Figure 3:
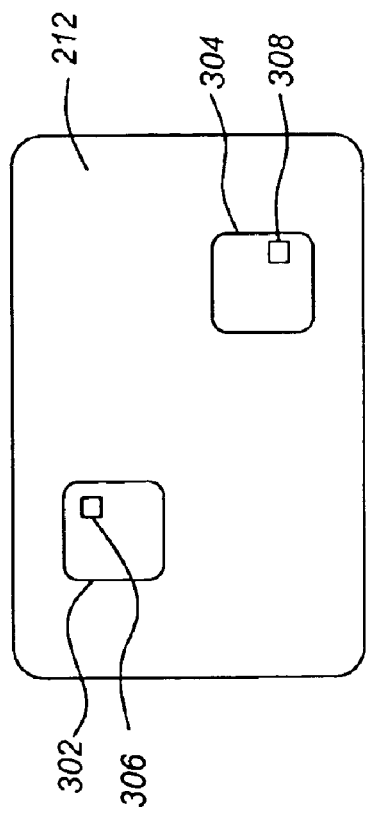
FIG. 3 shows a diagram of a smart card according to a preferred embodiment of the invention.

FIG. 3 is a diagram showing a smart card 212. The smart card 212 includes a first or primary processor 302 that, upon insertion into an electrical device such as the receiver 200, makes communicative contact with the transport module 208 via one or more primary processor contacts 306. In one embodiment, the smart card 212 and its associated interfaces in the receiver 200 is International Standards Organization (ISO) 7816 compliant.

The decrypting functions of the primary processor 302 are activated by an activating signal, which is typically provided after the user establishes a broadcast service account. In one embodiment, the activating signal comprises a message having a series of numbers or characters defining one or more decryption keys. In another embodiment, the activating signal may comprise a series of program instructions (which may also be encrypted) implementing one or more required subfunctions for program material decryption.

The activating signal can be delivered by different media, including, for example, over the air, via a cable line, the Internet, or a modem connection. Upon activation, the processor decrypting circuit is enabled, so that the encrypted television signal, transmitted by a broadcast service provider, can be decrypted.

The card 212 includes a second or backup microprocessor 304. The second microprocessor 304 can also make communicative contact with the receiver 200 via one or more backup processor contacts 308 upon insertion into the receiver.

The second processor 304 is activated by an activating signal. In one embodiment, the activating signal for the second processor 304 differs from the first activating signal so that the first activating signal will not activate the second microprocessor 304. In another embodiment, the activating signal is the same as the signal used to active the first processor 302. In this embodiment, retransmission of the first activating signal may be ignored by the functioning first processors 302, but may activate the second processors 304 on cards 212 having inoperative first processors 302.

The second activating signal can be provided from the control center 102 or uplink 104 by a secondary or backup security server, which formulates codes from resident algorithms, and broadcasts the codes or other information to the user's receivers 200. If required, the security server can be enabled and tested periodically to assure availability when needed. The first and/or the second activating signals can be transmitted to the receiver 200 via communications link 118 and/or communication link 120.

Figure 5:
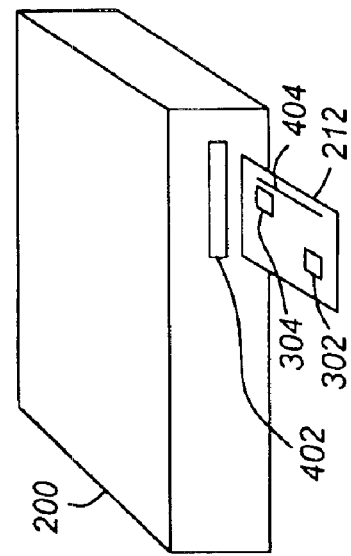
FIG. 5 is a diagram of an IRD receiving a smart card in a second position according to the invention, under emergency or backup operating conditions.
Figure 4:
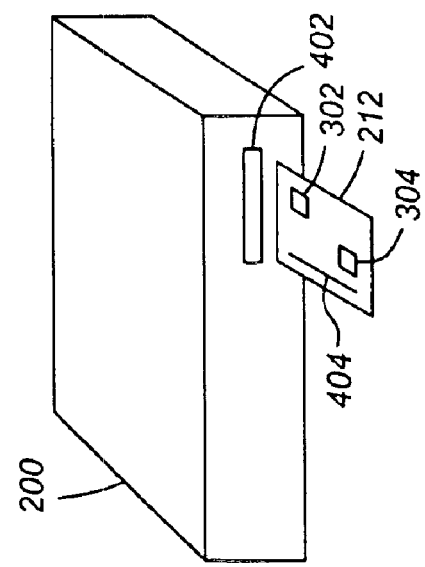
FIG. 4 is a diagram of an integrated receiver device (IRD) receiving a smart card in a first position according to the invention, under normal operating conditions.

Referring now to FIG. 4, the first processor 302 is situated on the card 212 so that an appropriate electrical contact with the receiver 200 is made upon insertion into the receiver opening 402. The second processor 304 is preferably situated on the smart card 212 so that, upon reversing the orientation of the smart card 212 and inserting the smart card 212 into the receiver opening 402 as shown in FIG. 5, the second processor 304 is situated on the card 212 so that an appropriate contact with the receiver 200 is made.

Thus, the first and second microprocessors 302, 304 can be positioned on the smart card 212 so that switching between use via the first microprocessor 302 and use via the second microprocessor 304 is accomplished by changing the orientation of the smart card 212. The arrangement of the primary and backup microprocessors 302, 304 can be positioned so that orientation of the smart card 212 can be changed by, for example, flipping the smart card 212 in a horizontal dimension or in a vertical dimension. Using this preferred arrangement, the same smart card 212 and the same electrical contact in the receiver opening 402 can be employed for both normal and backup or emergency operation.

Preferably, the smart card 212 bears an indication 404 of the appropriate orientation of the card 212 with respect to the opening 402. For example, the card 212 can be marked with an arrow 404 to indicate the proper end of the card to be inserted into the opening 402 during normal operation. Users can be instructed to rotate the card into a different orientation with respect to the arrow 404, or in accordance with a second marking or other indication on the card, for use during emergency conditions.

The first and second processors 302, 304 can be implemented by one or more semiconductor chips. Each may share a memory or comprise its own memory for storing program instructions and data. The first or primary processor 302 can be designed for normal operation to decode an encrypted program signal with optimal available security and protection against piracy as well as other preferred features. The second or backup processor 304 can be functionally equivalent to the first processor 302, or may optionally be designed to provide only a minimal level of security and other features essential to continued temporary operation. This embodiment has the advantage of preventing pirates from simply severing the card 212 to obtain two useable cards 212.

For example, the second processor 304 can employ lighter encryption using, for example, a smaller number of key characters. The second processor 304 may also implement processing instructions with less robust decryption routines, or may include a lower capacity memory than the first processor 302. Alternatively or in combination with the foregoing, the second processor 304 may comprise an early generation P1 chip or other off-the-shelf device. Minimizing the complexity and features of the backup microprocessor allows for reduced manufacturing costs. Because the backup microprocessor is used only during emergency operations, a simpler and less secure level of service is acceptable.

Because the second or backup processor 304 is activated only by a distinct activating signal that differs from the activating signal used during normal operation, the second processor 304 can not be used to pirate the broadcast signal during normal operation. During an emergency situation in which the first microprocessor fails and backup service is necessary, subscribers could be notified and instructed to change the orientation of the smart card to the correct position for backup service.

Figure 6A:
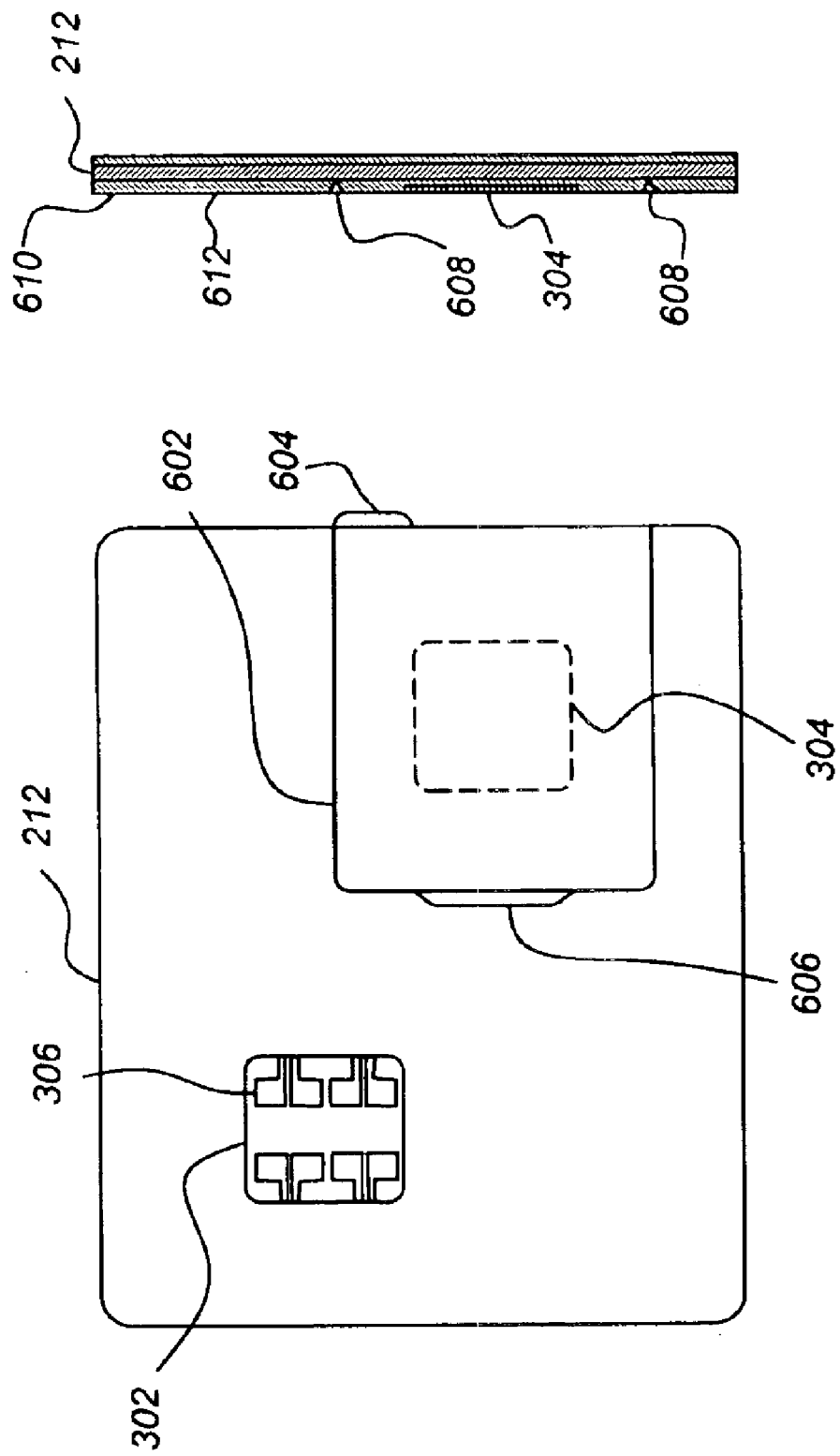
FIGS. 6A and 6B are diagrams presenting an alternative embodiment of the present invention in which the top layer of the card is removable.
Figure 6B:
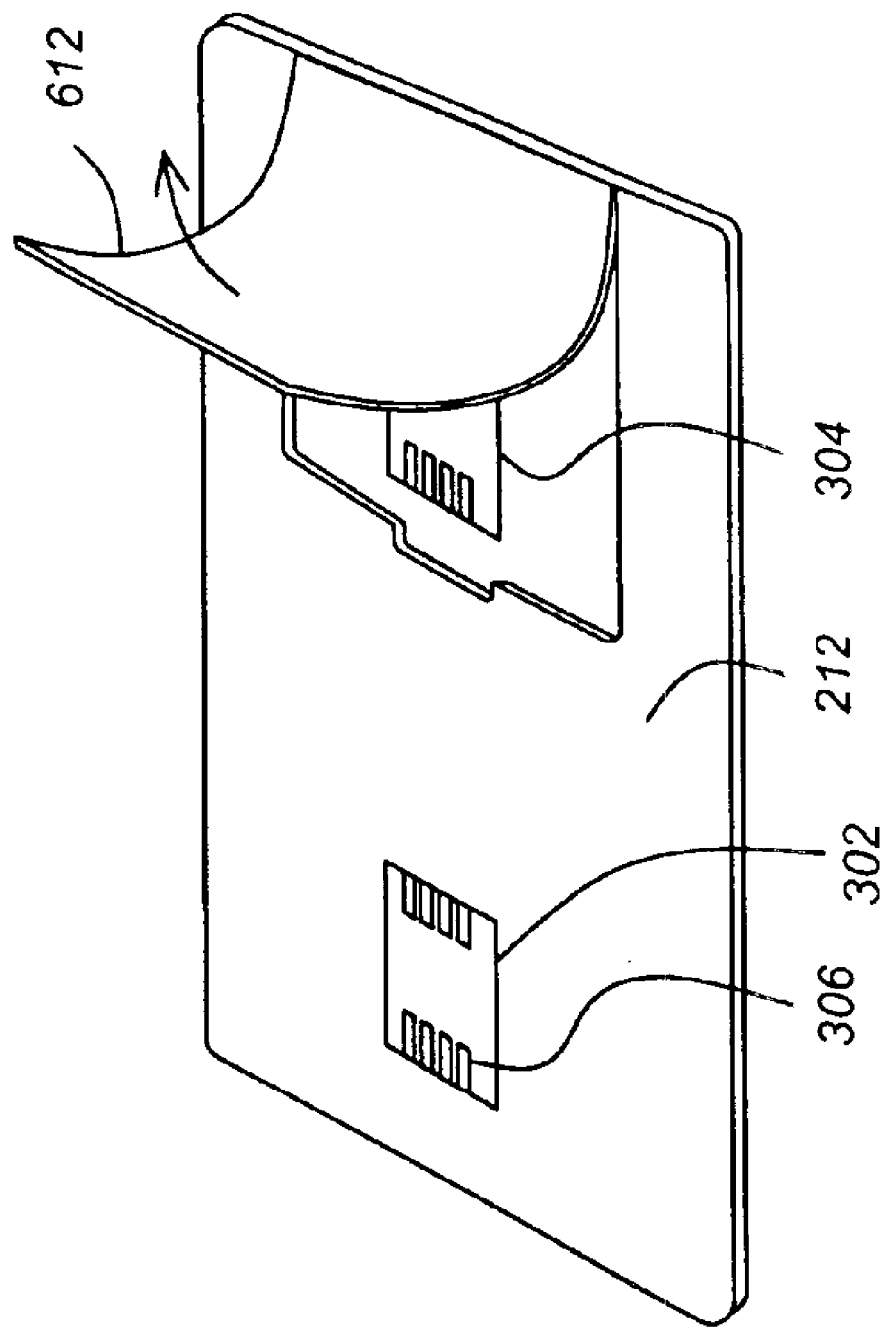

FIGS. 6A and 6B are a diagrams of an alternative embodiment of the present invention in which a portion of the top layer of the card is removable to expose the second processor 304 when needed. In this embodiment, the top layer 610 of the card 212 is scored with a plurality of scores 608, thereby defining a removable portion 602. When left in place, the removable portion 602 prevents communication between the second processor 304 and the receiver 200, and also prevents contamination of the second processor 304 and its contacts. In one embodiment, the removable portion 602 of the top layer 610 of the card 212, includes a tab 604, which can be gripped or used for leverage to remove the removable portion 602. Alternatively or in combination with the foregoing, the top layer 610 of the card 212 includes a void 606, thereby forming a slot between the removable portion 612 and the remainder of the top layer 610 of the card 212. This allows the user to insert a fingernail or small tool between the removable portion 602 and the remainder of the card 212 to exert sufficient force to remove the removable portion.

Figure 7:
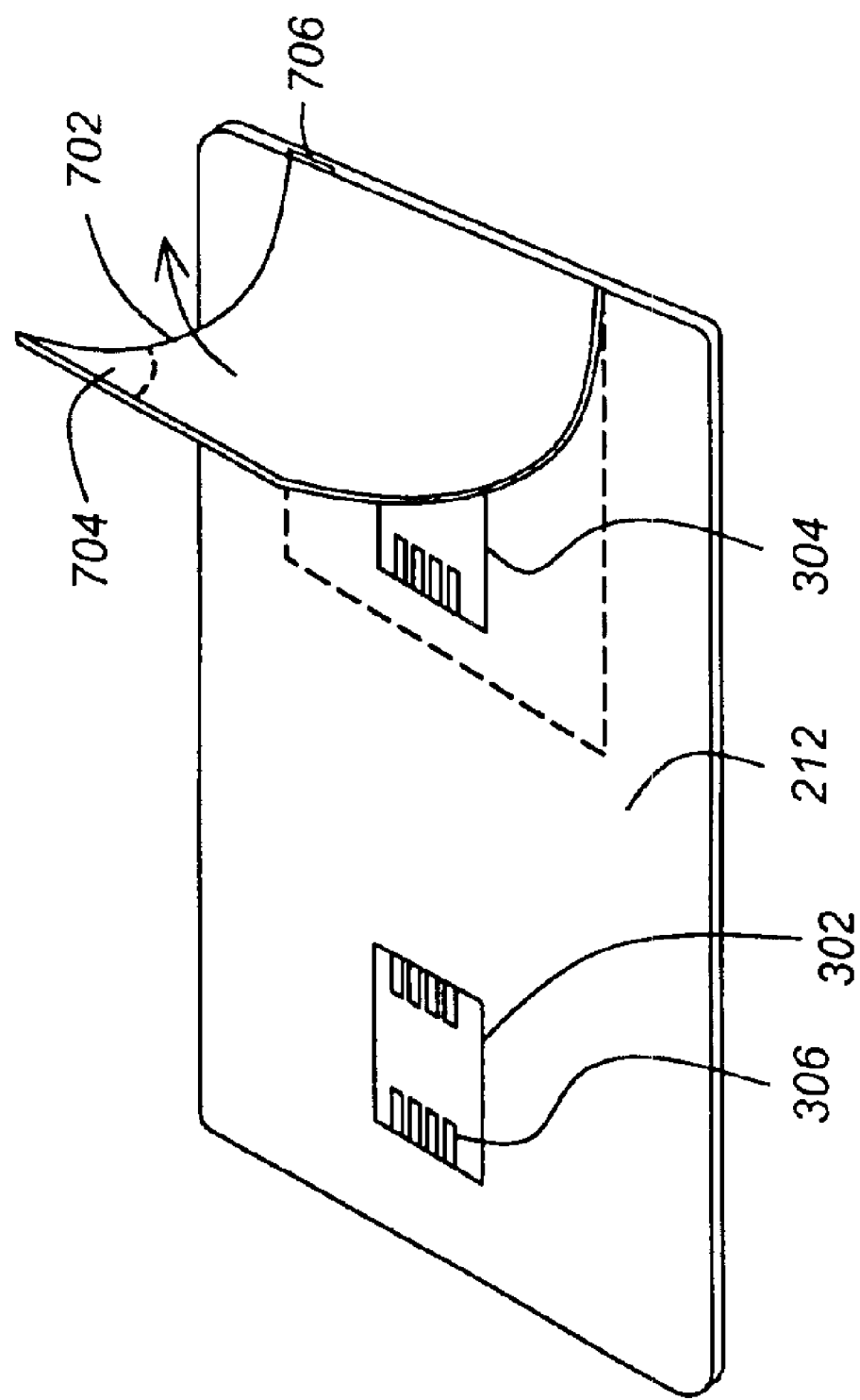
FIG. 7 is a diagram presenting an alternative embodiment of the present invention including a peel-off cover.

FIG. 7 is a diagram presenting an alternative embodiment of the present invention in which the card 212 includes a peel-off cover 702 to protect the second processor 304 until it is needed. The cover is affixed to the card 212 via a suitable adhesive to prevent communications between the second processor 304 and the receiver 200 and to prevent contamination of the second processor 304 and its contacts. The peel-off cover 702 can be removed by pulling up on an area 704 that has either reduced or no adhesion, or by gripping a tab 706, and pulling the cover off. If necessary, no adhesive may be placed on the cover 702 in areas where the adhesive would otherwise come in contact with the second processor 304 or its contacts. This prevents contamination of the contacts by the adhesive. Alternatively, a different adhesive can be used to prevent such contamination.

Figure 8:
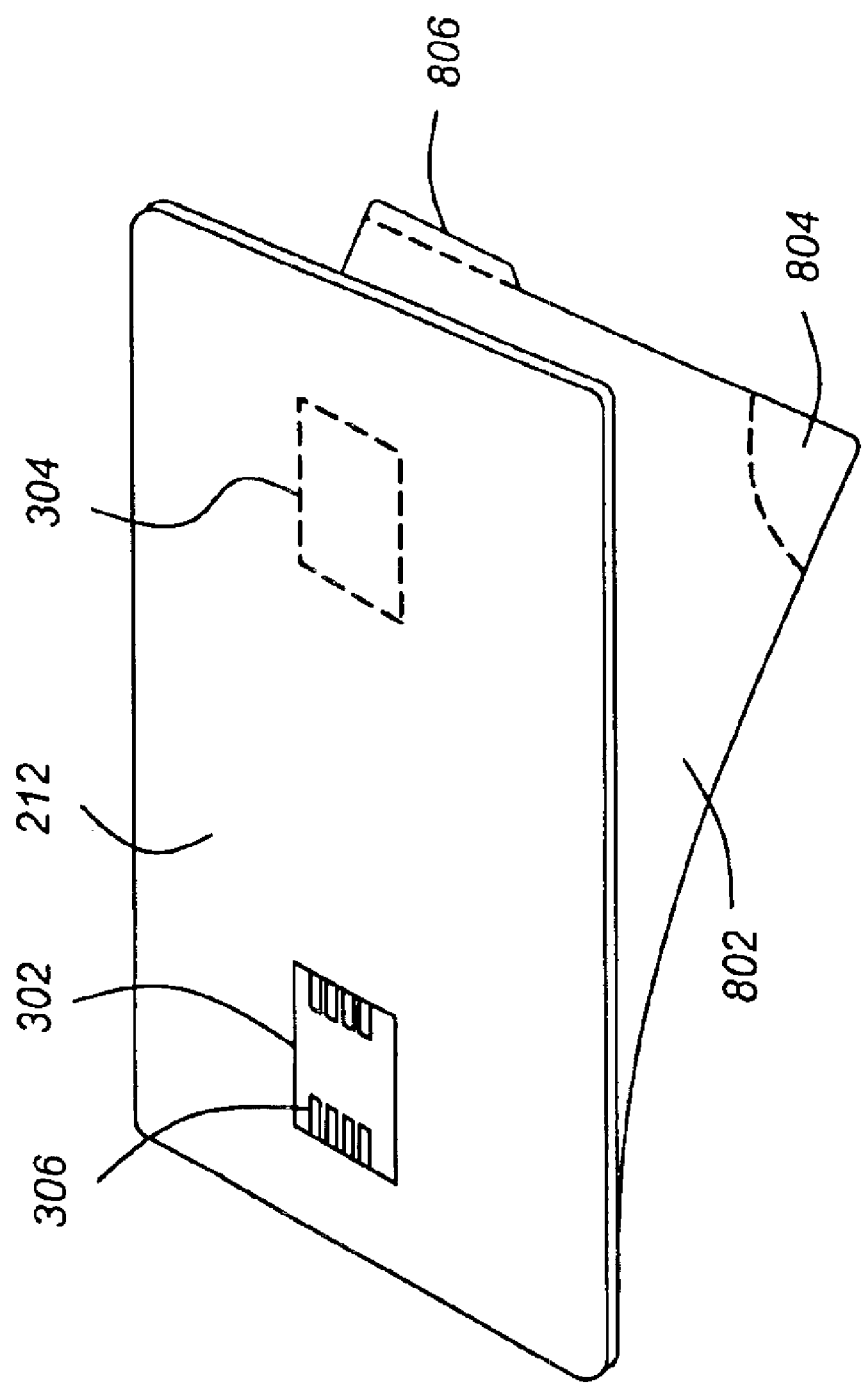
FIG. 8 is a diagram presenting a further alternative embodiment of the present invention in which the peel-off cover and the second processor is disposed on a second side of the card.

FIG. 8 is a diagram presenting another embodiment of the present invention, in which a peel-off adhesive cover is used, but in which the second processor 304 is disposed on the opposite side of the card 212. To use this embodiment of the card 212 in the emergency mode, the user reverses the orientation of the card and turns the card over so that the second processor 304 contacts are in communication with the receiver 200.

In this embodiment, the cover 802 is disposed on the second side of the card 212. The cover may optionally include a non-adhesive or reduced adhesive portion 804 to permit easy removal of the cover 802. Alternatively, a tab 806 may be provided for this purpose. In one embodiment, the dimensional extent of the cover 804 is substantially the same as that of the card 212. This embodiment has the advantage of presenting an appearance that does not plainly reveal the existence of the second processor.

Figure 9:
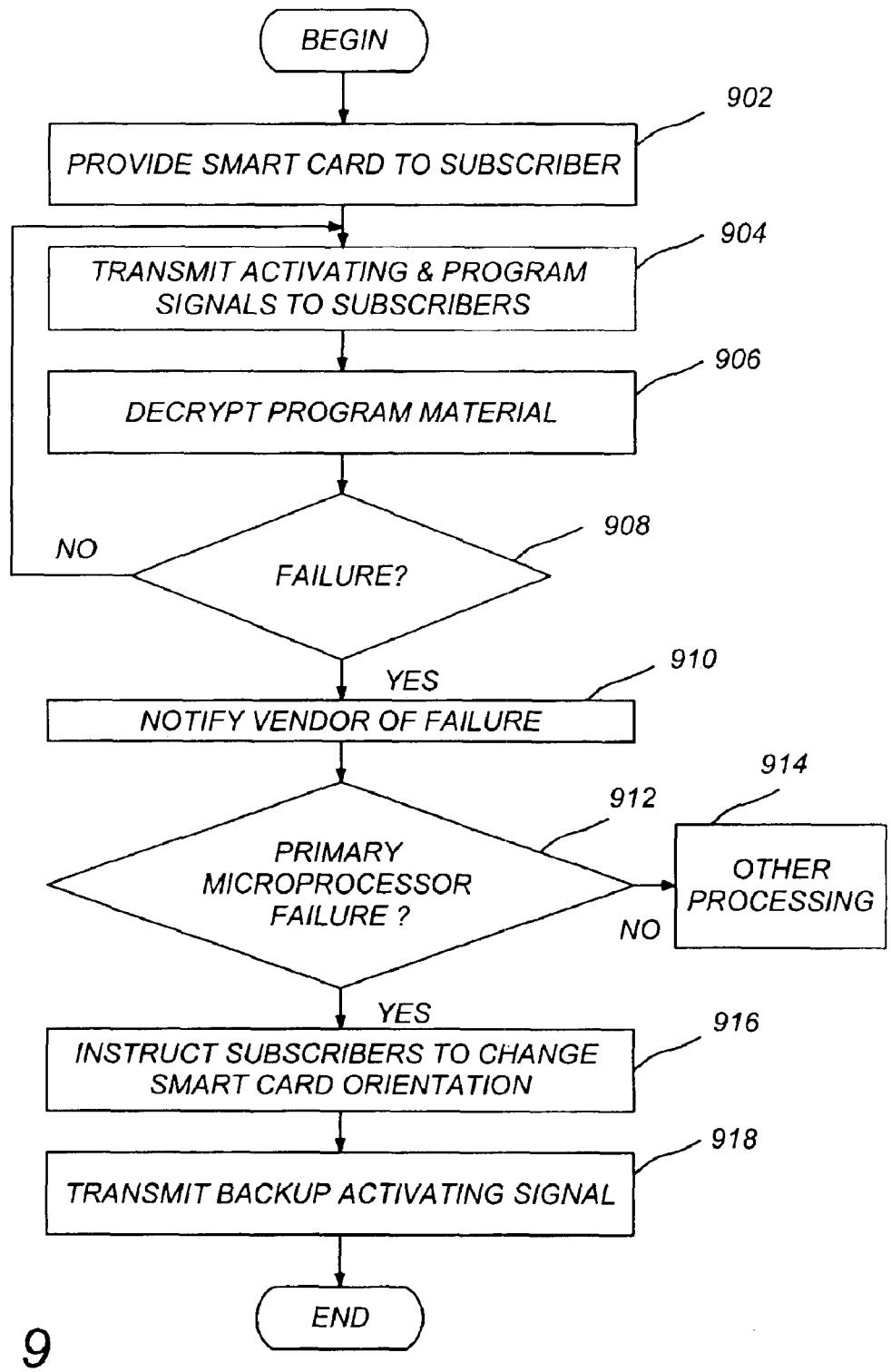
FIG. 9 is a flow chart presenting exemplary method steps used to practice one embodiment of the present invention.

A flow chart presenting exemplary method steps used to practice one embodiment of the present invention is shown in FIG. 9. First, smart cards 212 are provided to subscribers, as in block 902. The smart cards can be provided directly to the subscriber by the vendor, or indirectly through a third party. Typically, the vendor will want to exert control over the design and distribution of smart cards to coordinate their use with other aspects of the program distribution system. Next, the control center 102 sends activating and program signals that are received by subscribers, as shown in block 904. The smart cards 212 are activated and serve to decrypt program signals, as in block 906. Subscribers can then enjoy access to programs.

In the event of failure, as in block 908, for example, should a problematic signal or other problem cause primary microprocessors to fail, the microprocessors cease to decrypt program signals. In the absence of a failure, subscribers continue to receive and decrypt program signals. A failure may lead subscribers to notify the vendor of the failure to access programs, as shown in block 910, or the vendor may already have become aware of the failure by other means. In response, the vendor seeks to identify the cause of the failure, as in block 912, and determines that the failure is due to inactivated primary microprocessors. The vendor then instructs the subscribers to change the orientation of their smart cards to the backup orientation, 916, and as shown in block 918, the control center 102 transmits a backup activating signal. The steps shown in blocks 916 and 918 may occur in different sequences in different embodiments of the method. In response to the instruction, the subscribers re-insert their smart cards 212 into the receivers 200 in the backup orientation and resume enjoyment of program material. The smart card system and method disclosed herein avoids the need to interrupt program service to subscribers while waiting for replacement of smart cards 212 in the event a number of smart cards become disabled. This invention provides for a quick and efficient emergency card change with a minimal loss of service to the customer. Minimizing the disruption of service to customers reduces the risk of losing customers to competitors during such emergency situations.

CONCLUSION

A number of embodiments of the invention have been described herein, but it will be evident to the skilled person that numerous alternative embodiments may also be adopted. Such alternative embodiments will also accomplish the objective of providing backup services that can be activated during an emergency situation.

For example, although the foregoing has been described with respect to the use of a backup microprocessor, the devices and techniques disclosed herein can be used to provide backup capability for function-critical components. Further, the smart card 212 can be any type of device that provides conditional access to a service. Although such devices are typically the approximate size and shape of a credit card, other sizes and shapes can be used to accomplish the same objective of providing access. The system and method of the invention can be adapted to other types of conditional access systems in which emergency or backup access is provided via a separately activated backup component located on the same device that is used for normal operations.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A smart card, comprising:
   a first processor, for decrypting an encrypted program signal;
   a second processor, for decrypting the encrypted program signal;
   wherein the first processor is activated by a first activating signal and the second processor is activated by a second activating signal differing from the first activating signal, the first and second processors are communicable with an electrical device for receiving the program signal, the first activating signal and the second activating signal, and the first processor is disposed to communicate with the device when the card is in a first orientation, and the second processor is situated so as to communicate with the device when the card is in a second orientation.

2. The apparatus of claim 1, further comprising a cover, removably attached to the smart card so as to prevent communication between the second processor and the electrical device.

3. The apparatus of claim 1, wherein the smart card further comprises a removable portion covering the second processor so as to prevent communications between the second processor and the electrical device.

4. The apparatus of claim 3, wherein the removable portion comprises a tab for gripping and removing the removable portion to allow communications between the second processor and the electrical device.

5. The apparatus of claim 3, wherein the smart card comprises a top layer and the removable portion is peripherally described by scores in the top layer.

6. The apparatus of claim 5, wherein the smart card further comprises a void disposed adjacent the removable portion.

7. The apparatus of claim 1, wherein the first processor is disposed on a first side of the smart card, and the second processor is disposed on a second side of the smart card, and wherein the apparatus further comprises:
   a cover, removably attached to the second side of the smart card so as to prevent communications between the second processor and the electrical device.

8. The apparatus of claim 7, wherein an extent of the cover substantially coincides with an extent of the smart card.

9. The apparatus of claim 7, wherein the cover comprises a tab.

10. The apparatus of claim 7, wherein the cover is adhesively secured to the smart card.

11. The apparatus of claim 7, wherein a portion of the cover is adhesively secured to the smart card.

12. The apparatus of claim 1, further comprising an indication of the first orientation of the card.

13. The apparatus of claim 1, wherein the electrical device is an integrated receiver device.

14. The apparatus of claim 1, wherein the second processor is of lower complexity than the first processor.

15. A method of providing a backup program device to a subscriber, the method comprising the steps of:
   providing to the subscriber a smart card having a primary processor that decodes a scrambled program signal upon activation by a primary activating signal, and a backup processor that decodes a scrambled program signal upon activating by a backup activating signal; and
   transmitting the backup activating signal when the primary activating signal is insufficient to enable decoding of the scrambled program signal; and
   wherein the primary processor comprises contacts disposed so as to communicate with the back up program device when the smart card is in a first orientation, and the backup processor comprises contacts disposed so as to communicate with the back up program device when the smart card is in a second orientation.

16. The method of claim 15, wherein the backup activating signal is transmitted upon failure of the primary processor.

17. The method of claim 15, wherein the primary and backup processors communicate with an electrical device for receiving the program signal, the primary activating signal and the backup activating signal.

18. The method of claim 15, wherein the smart card further comprises an indication of the first orientation of the smart card.

19. The method of claim 15, wherein the backup processor is of lower complexity than the primary processor.

20. A system for providing a program signal to subscribers comprising:
   a receiver for receiving signals from a program source, wherein the signals include program material, a primary activating signal and a backup activating signal; and
   a smart card comprising a first processor for decrypting received signals upon activation by the primary activating signal and a second processor for decrypting received signals when the backup activating signal is received by the receiver; and
   wherein the primary processor is situated so as to communicate with the receiver when the smart card is in a first orientation, and the backup processor is situated so as to communicate with the receiver when the smart card is in a second orientation.

21. The system of claim 20, wherein the backup activating signal is transmitted upon failure of the primary processor.

22. The system of claim 20, wherein the primary and backup processors are situated in the smart card so as to communicate with the receiver.

23. The system of claim 20, wherein the smart card further comprises an indication of the first orientation of the card.

24. The system of claim 20, wherein the backup processor is of lower complexity than the primary processor.

25. A smart card apparatus, comprising:
   a primary processor, for decrypting an encrypted program signal; and
   a back up processor, for decrypting the encrypted program signal;
   wherein the primary processor is activated by a primary activating signal and the backup processor is activated by a backup activating signal differing from the primary activating signal; and
   wherein the primary processor is disposed to communicate with a device when the smart card is in a first orientation, and the backup processor is situated so as to communicate with the device when the smart card is in a second orientation.

26. The apparatus of claim 25, wherein the primary and backup processors are communicable with an electrical device for receiving the program signal, the primary activating signal and the backup activating signal.

27. The apparatus of claim 26, further comprising a cover, removably attached to the smart card so as to prevent communications between the backup processor and the electrical device.

28. The apparatus of claim 26, wherein the smart card further comprises a removable portion covering the backup processor so as to prevent communications between the backup processor and the electrical device.

29. The apparatus of claim 28, wherein the removable portion comprises a tab for gripping and removing the removable portion to allow communications between the backup processor and the electrical device.

30. The apparatus of claim 28, wherein the smart card comprises a top layer and the removable portion is peripherally described by scores in the top layer.

31. The apparatus of claim 28, wherein the smart card further comprises a void disposed adjacent the removable portion.

32. The apparatus of claim 26, wherein the primary processor is disposed on a first side of the smart card, and the backup processor is disposed on a second side of the smart card, and wherein the apparatus further comprises:
   a cover, removably attached to the second side of the smart card so as to prevent communications between the backup processor and the electrical device.

33. The apparatus of claim 32, wherein an extent of the cover substantially coincides with an extent of the smart card.

34. The apparatus of claim 32, wherein the cover comprises a tab.

35. The apparatus of claim 32, wherein the cover is adhesively secured to the smart card.

36. The apparatus of claim 32, wherein a portion of the cover is adhesively secured to the smart card.

37. The apparatus of claim 25, further comprising an indication of the first orientation of the smart card.

38. The apparatus of claim 25, wherein the device is an integrated receiver device.

39. The apparatus of claim 25, wherein the backup processor is of lower complexity than the primary processor.

40. The apparatus of claim 25, wherein backup processor is activated with the backup activating signal after failure of the primary processor.

* * * * *